(12) United States Patent
Shankar

(10) Patent No.: US 12,493,988 B1
(45) Date of Patent: Dec. 9, 2025

(54) CAMERA HEIGHT ESTIMATION

(71) Applicant: Lytx, Inc., San Diego, CA (US)

(72) Inventor: Bhawani Shankar, Bhagalpur (IN)

(73) Assignee: Lytx, Inc., San Diego, CA (US)

( * ) Notice: Subject to any disclaimer, the term of this patent is extended or adjusted under 35 U.S.C. 154(b) by 249 days.

(21) Appl. No.: 18/229,242

(22) Filed: Aug. 2, 2023

(51) Int. Cl.
    *G06T 7/80* (2017.01)
(52) U.S. Cl.
    CPC ...... *G06T 7/80* (2017.01); *G06T 2207/20081* (2013.01); *G06T 2207/30256* (2013.01)
(58) Field of Classification Search
    CPC ............ G06T 7/80; G06T 2207/20081; G06T 2207/30256
    See application file for complete search history.

(56) References Cited

U.S. PATENT DOCUMENTS

| | | | |
|---|---|---|---|
| 2015/0092058 A1* | 4/2015 | Bone | G06T 7/80 348/148 |
| 2015/0332098 A1* | 11/2015 | Wang | G06T 7/73 382/103 |
| 2018/0192035 A1* | 7/2018 | Dabeer | G06T 5/50 |
| 2021/0101616 A1* | 4/2021 | Hayat | G06T 7/20 |
| 2021/0365701 A1* | 11/2021 | Eshet | B60W 30/181 |
| 2022/0001872 A1* | 1/2022 | Taieb | G06V 10/44 |
| 2022/0215603 A1* | 7/2022 | Goldman | B60W 30/18009 |
| 2022/0270358 A1* | 8/2022 | Cox | G06V 10/811 |
| 2022/0366700 A1* | 11/2022 | Endo | G06T 7/74 |
| 2022/0371583 A1* | 11/2022 | Kario | B60W 30/0956 |
| 2023/0005374 A1* | 1/2023 | Elimaleh | G08G 1/065 |

OTHER PUBLICATIONS

Ahmed Ali et al., "Real-time vehicle distance estimation using single view geometry," Mar. 2020, Proceedings of the IEEE/CVF Winter Conference on Applications of Computer Vision (WACV), 2020, pp. 365-372.*
Zhong Cao et al.,"A geometry-driven car-following distance estimation algorithm robust to road slopes," Mar. 21, 2019, Transportation Research Part C 102 (2019),pp. 274-285.*
Si-Ho Lee et al.,"Study on Image Correction and Optimization of Mounting Positions of Dual Cameras for Vehicle Test," Aug. 9, 2021, Energies 2021, 14,4857,pp. 1-16.*
Jinbeum Jang et al.,"Camera Orientation Estimation Using Motion-Based Vanishing Point Detection for Advanced Driver-Assistance Systems," May 14, 2020, IEEE Transactions on Intelligent Transportation Systems, vol. 22, No. 10, Oct. 2021,pp. 6286-6294.*
David C. Andrade et al.,"A Novel Strategy for Road Lane Detection and Tracking Based on a Vehicle's Forward Monocular Camera," Mar. 29, 2019, IEEE Transactions on Intelligent Transportation Systems, vol. 20, No. 4, Apr. 2019, pp. 1497-1504.*
Vijay Kakani et al.,"Feasible Self-Calibration of Larger Field-of-View (FOV) Camera Sensors for the Advanced Driver-Assistance System (ADAS)," Jul. 31, 2019, sensors,2019, 19, 3369,pp. 1-9,14-25.*

* cited by examiner

Primary Examiner — Omar S Ismail
(74) Attorney, Agent, or Firm — Van Pelt, Yi & James LLP

(57) ABSTRACT

A system for calculating height and offset of a vehicle-mounted camera includes an interface and a processor. The interface is configured to receive image data from a camera mounted on a vehicle. The processor is configured to determine a set of lane lines using the image, determine points for calculating height and offset of the camera using a pair of lane lines, and calculate the height and the offset of the camera using the points.

19 Claims, 15 Drawing Sheets

CAMERA HEIGHT ESTIMATION

BACKGROUND OF THE INVENTION

Modern vehicles often include vehicle management services in order to support driver safety, operational safety, and operational productivity. Examples of vehicle management services include receiving routing information, vehicle event recorders, driving guidance (e.g., advanced driver assistance systems (ADAS)), etc. A vehicle event recorder typically includes a set of sensors, for example, video recorders, audio recorders, accelerometers, gyroscopes, vehicle state sensors, global positioning systems (GPS), etc., that report data that can be analyzed to determine the occurrence of anomalous events (e.g., lane changes, accidents, risky maneuvers, etc.).

For a vehicle event recorder to provide accurate data, it must be calibrated when it is installed on a vehicle. Calibration includes determining the location of cameras and/or video recorders of the vehicle event recorder. Detection of an event like tailgating, lane crossing, etc. utilizes sensor location information in conjunction with sensor output. This is a problem because sensor location measurements cannot be taken without calibration and the calibration process for a vehicle event recorder can be difficult, error-prone, or cumbersome.

BRIEF DESCRIPTION OF THE DRAWINGS

Various embodiments of the invention are disclosed in the following detailed description and the accompanying drawings.

DETAILED DESCRIPTION

Figure 1:
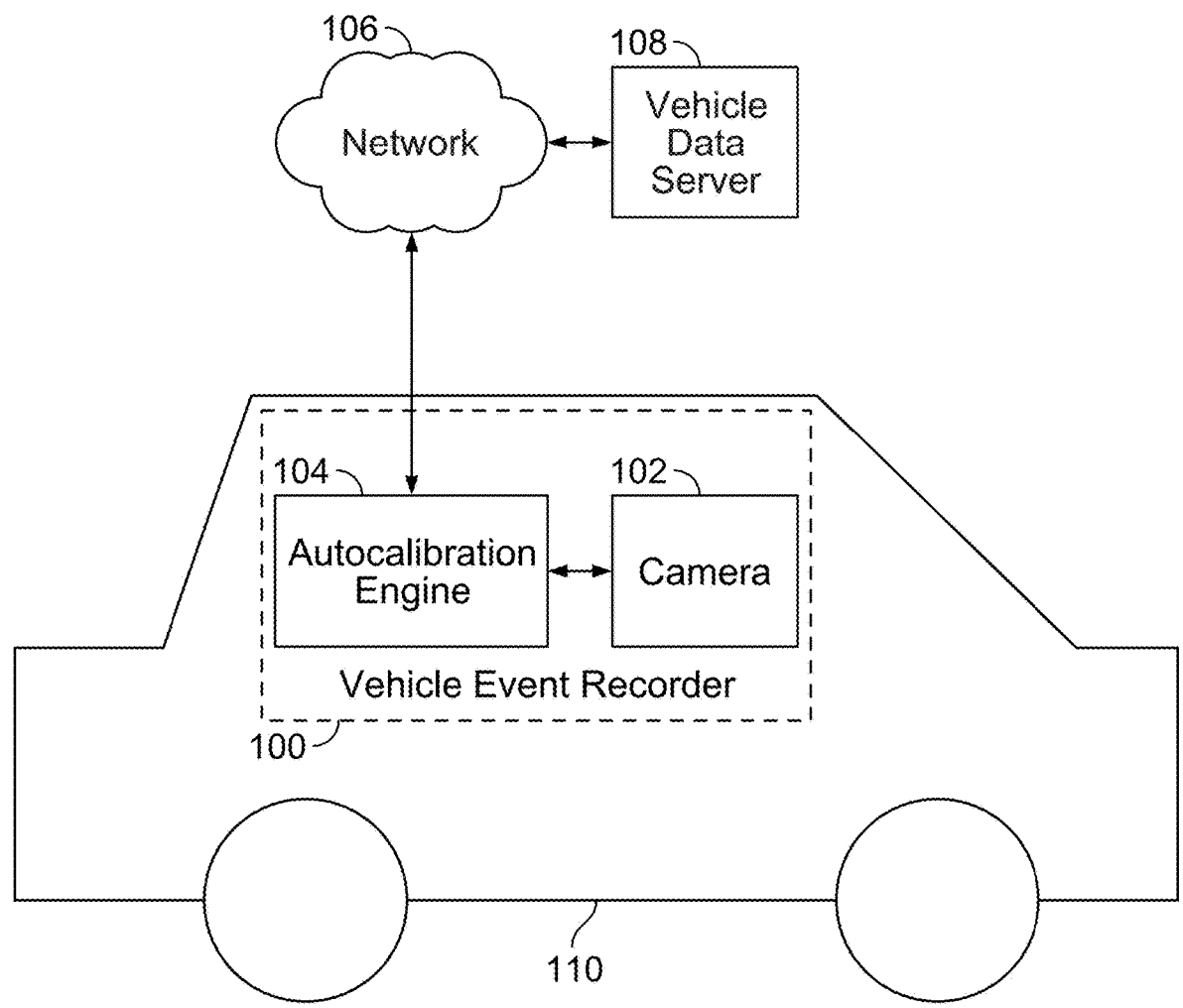
FIG. 1 is a block diagram illustrating an embodiment of a system for calculating height and offset of a vehicle-mounted camera as part of a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for calculating height and offset of a vehicle-mounted camera is disclosed. The system includes an interface and a processor. The interface is configured to receive image data from a camera mounted on a vehicle. The processor is configured to determine a set of lane lines using the image, determine points for calculating height and offset of the camera using a pair of lane lines, and calculate the height and the offset of the camera using the points.

The system for calculating height and offset of a vehicle-mounted camera uses images received from a vehicle-mounted camera and analyzes the images to enable the calculations for height and offset. Advanced driver assistance systems (ADAS) use the parameters of vehicle height and offset during determinations of tailgating and lane crossings. Currently, these parameters are manually measured and fed into the system during installation on the vehicle as part of a calibration process for the device. However, not only does this calibration process introduce a lot of friction during installation leading to resistance to making accurate measurements or adopting the device, but also, in the event that the device is moved after installation, errors in ADAS determinations will develop as a result.

The system receives one or more images from a vehicle-mounted camera. An image of the one or more images is analyzed by the system to find lane lines. In various embodiments, the set of lane lines is determined by detecting lane marker points in the image, applying lines of best fit to lane marker points in the image, applying a machine learning model to determine lane lines in the image, or any other appropriate line detection method. In some embodiments, the system determines a set of more than two lane lines. The set or a subset of these lines is used to calculate height and offset of the camera. For example, pairs of lines are selected based on error associated with line fit, selected by applying a machine learning model, selected arbitrarily, formed exhaustively from the set of lane lines, or selected using any other appropriate method. In some embodiments, a pair of lines is used to determine the relevant points for calculating the height and the offset of the vehicle-mounted camera, where the relevant points include a horizon point (e.g., an intersection point between the pair of lines), points to form a baseline (e.g., two corresponding points in each of the pair of lines that form a perpendicular segment to the pair of lines, a point on the baseline corresponding to an offset position of the vehicle-mounted camera, or any other appropriate points. The system then uses the relevant points to calculate the height and the offset. In various embodiments, the system provides calculated height and offset values to a user or to an automated ADAS system. The provided values may be a combination or subset of the outputs of the calculated heights and offsets (e.g., from different pairs of lines from the set of lines or from different sets of lines from different images received from the vehicle).

In some embodiments, the system may comprise a vehicle event recorder, driving guidance system, or other vehicle management service system. In some embodiments, the system utilizes global positioning system (GPS) data. For example, if GPS data of a vehicle determines that a vehicle is on a road associated with a known lane width, the lane width can be used when analyzing image data associated with the vehicle's camera.

In some embodiments, the system for calculating the height and the offset improves the computing system by avoiding the manual calibration setup process. Instead, the system is able to automatically calculate the height and the offset. In doing so, the system enhances the efficiency and simplifies the installation process for the device. Errors or inaccuracies associated with the manual calibration process may also be reduced. The process of moving the device after installation (e.g., changing the camera position, reinstalling the device on a different vehicle, etc.) is likewise improved by enabling the system to automatically calculate the height and offset for the vehicle at a relevant time for the current location of the device. These current height and offset measurements can then be used by other systems so that inaccuracies are not propagated to other calculations that use the height and offset in their calculations (e.g., other automatic driving detection system calculations—for example, following distance calculations).

FIG. 1 is a block diagram illustrating an embodiment of a system for calculating height and offset of a vehicle-mounted camera as part of a vehicle event recorder. In the example shown, vehicle event recorder 100 is mounted in a vehicle 110 (e.g., a car, truck, commercial vehicle, etc.) and communicates with vehicle data server 108 via network 106. Vehicle event recorder 100 includes or is in communication with a set of sensors—for example, video recorders, audio recorders, accelerometers, gyroscopes, vehicle state sensors, proximity sensors, a global positioning system (GPS), outdoor temperature sensors, moisture sensors, or any other appropriate sensors. In the example shown, vehicle event recorder 100 includes camera 102. In various embodiments, vehicle state sensors comprise a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, traction control system sensors, drive wheel speed sensors, an engine exhaust sensor, a gear position sensor, a cabin equipment operation sensor, or any other appropriate vehicle state sensors. Vehicle event recorder 100 comprises a system for processing sensor data and detecting events. In the example shown, vehicle event recorder 100 includes autocalibration engine 104. autocalibration engine 104 calculates height and offset of camera 102. In some embodiments, a height and offset of camera 102 calculation is performed using vehicle data server 108. In various embodiments, vehicle event recorder 100 is mounted on vehicle 110 in one of the following locations: the chassis, the front grill, the dashboard, the rear-view mirror, or any other appropriate location. In some embodiments, vehicle event recorder 100 comprises multiple units mounted in different locations in vehicle 110. In some embodiments, Vehicle event recorder 100 comprises a communications system for communicating with network 106. In various embodiments, network 106 comprises a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, or any other appropriate network. In some embodiments, network 106 comprises multiple networks, changing over time and location. In some embodiments, different networks comprising network 106 comprise different bandwidth cost (e.g., a wired network has a very low cost, a wireless Ethernet connection has a moderate cost, a cellular data network has a high cost, etc.). In some embodiments, network 106 has a different cost at different times (e.g., a higher cost during the day and a lower cost at night). Vehicle data server 108 comprises a vehicle data server for collecting events detected by vehicle event recorder 100. In some embodiments, vehicle data server 108 comprises a system for collecting data from multiple vehicle event recorders. In some embodiments, vehicle data server 108 comprises a system for analyzing vehicle event recorder data. In some embodiments, vehicle data server 108 comprises a system for displaying vehicle event recorder data. In some embodiments, vehicle data server 108 is located at a home station (e.g., a shipping company office, a taxi dispatcher, a truck depot, etc.). In various embodiments, vehicle data server 108 is located at a colocation center (e.g., a center where equipment, space, and bandwidth are available for rental), at a cloud service provider, or at any other appropriate location. In some embodiments, events recorded by vehicle event recorder 100 are downloaded to vehicle data server 108 when vehicle 110 arrives at the home station. In some embodiments, vehicle data server 108 is located at a remote location. In some embodiments, events recorded by vehicle event recorder 100 are downloaded to vehicle data server 108 wirelessly. In some embodiments, a subset of events recorded by vehicle event recorder 100 is downloaded to vehicle data server 108 wirelessly.

Figure 2:
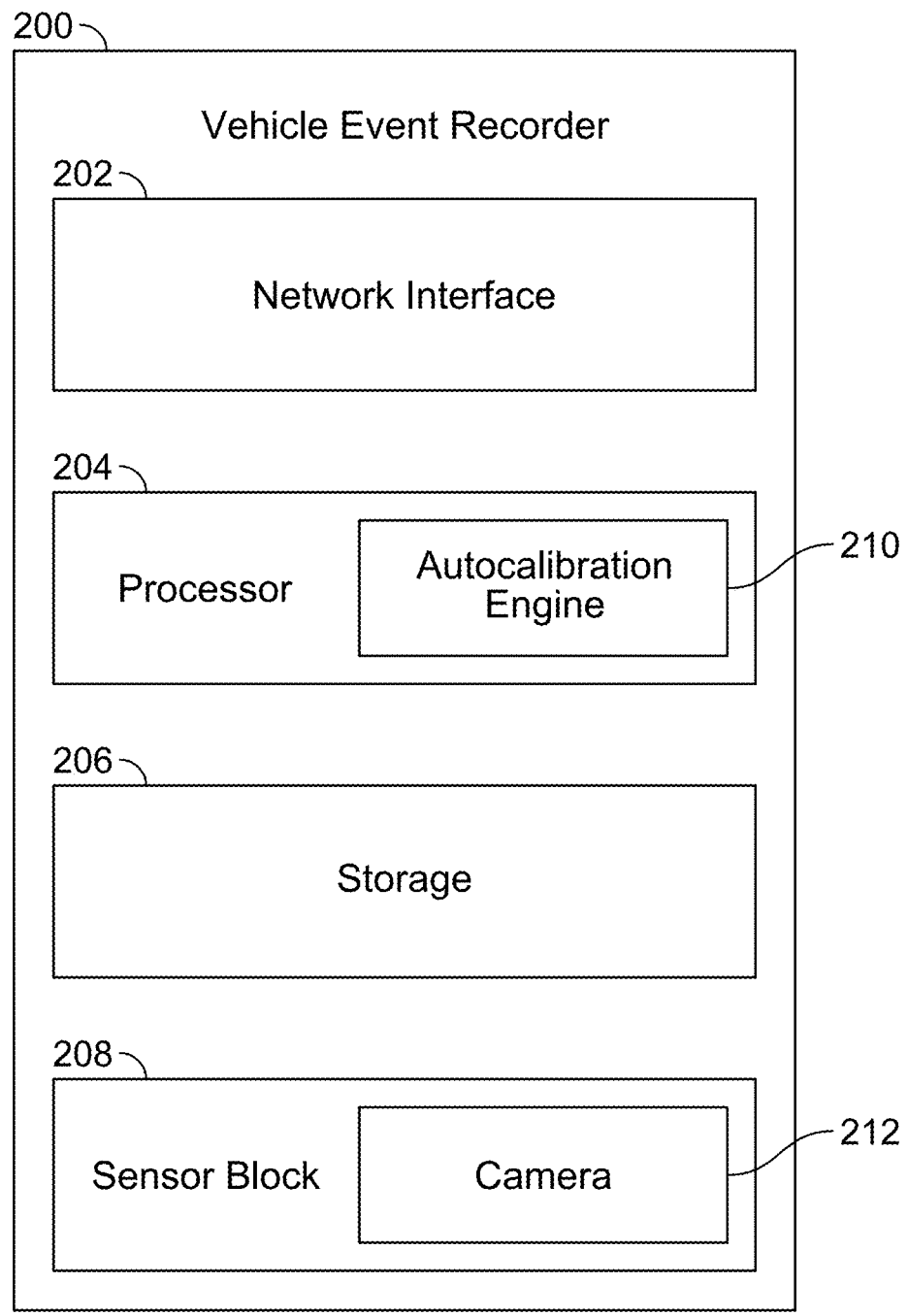
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 100 of FIG. 1. In the example shown, vehicle event recorder 200 comprises processor 204. Processor 204 comprises a processor for controlling the operations of vehicle event recorder 200, for reading and writing information on storage 206, for communicating via network interface 202 (e.g., communicating to a vehicle data server via a cell network and/or a WiFi network), and for reading data via sensor block 208. In various embodiments, processor 204 comprises a processor for determining event(s) using received and/or measured data from sensors, determining thresholds for event detection, determining a maintenance item, or for any other appropriate purpose. In the example shown, processor 204 includes autocalibration engine 210. Autocalibration engine 210 calculates height and offset of camera 212 (e.g., a forward-facing camera that can take images/video of the view of the exterior of a vehicle in the forward direction of the vehicle—for example a dash camera facing out the windshield). Autocalibration engine 210 analyzes image information from camera 212 to determine a height and an offset (e.g., left right position within the vehicle cab) location for camera 212 using information derived from the image (e.g., lane line positions and horizon location). The calculation of camera 212 location without manual measurement on placement of the camera, enables the camera to be more easily installed and used by a user/company client in vehicles. Storage 206 comprises a data storage (e.g., a random access memory (RAM), a read only memory (ROM), a nonvolatile memory, a flash memory, a hard disk, or any other appropriate data storage). In various embodiments, storage 206 comprises a data storage for storing instructions for processor 204, vehicle event recorder data, vehicle event data, sensor data, video data, or any other appropriate data. In various embodiments, network interface 202 comprises one or more of a GSM interface, a CDMA interface, a LTE interface, a UMTS interface, a WiMAX interface, a DSRC interface, a WiFi™ interface, an Ethernet interface, a Universal Serial Bus (USB) interface, a Bluetooth™ interface, an Internet interface, or any other appropriate interface. Sensor block 208 comprises an interface to one or more vehicle event recorder sensors (e.g., camera 212). In various embodiments, vehicle event recorder sensors comprise an exterior video camera, an exterior still camera, an interior video camera, an interior still camera, a microphone, an accelerometer, a gyroscope, an outdoor temperature sensor, a moisture sensor, a laser line tracker sensor, vehicle state sensors, or any other appropriate sensors. In various embodiments, vehicle state sensors comprise a speedometer, an accelerator pedal sensor, a brake pedal sensor, an engine RPM sensor, an engine temperature sensor, a headlight sensor, an airbag deployment sensor, driver and passenger seat weight sensors, an antilocking brake sensor, shocks sensors, an engine exhaust sensor, a gear position sensor, a turn signal sensor, a cabin equipment operation sensor, or any other appropriate vehicle state sensors. In some embodiments, sensor block 208 comprises an on-board diagnostics (OBD) bus (e.g., society of automotive engineers (SAE) J1939, J1708/J1587, OBD-II, CAN BUS, etc.). In some embodiments, vehicle event recorder 200 communicates with vehicle state sensors via the OBD bus. In some embodiments, vehicle event recorder 200 communicates with a vehicle data server via network interface 202. In various embodiments, vehicle event recorder 200 transmits vehicle state sensor data, accelerometer data, speed data, maneuver data, audio data, video data, event data, or any other appropriate data to a vehicle data server.

In some embodiments, vehicle event recorder 200 comprises a system for determining events from data. In some embodiments, vehicle event recorder 200 stores data in a time-delay buffer (e.g., a buffer holding the last 30 seconds of data, the last 5 minutes of data, etc.). In some embodiments, data is deleted from the time-delay buffer after the time-delay period (e.g., a buffer holding the last 30 seconds of data deletes data as soon as it is more than 30 seconds old). In some embodiments, in the event an event is determined from data in the time-delay buffer, data associated with the event is copied from the time-delay buffer into a long-term storage. In various embodiments, event information and associated data is stored, processed, uploaded immediately, uploaded at a later time, provided to an administrator, or handled in any other appropriate way. In some embodiments, data is continually stored (e.g., and not deleted after a time-delay period). In some embodiments, in the event that an event is determined from continuously stored data, an event flag is stored associated with the continuously stored data. In some embodiments, data storage is modified based at least in part on an event flag (e.g., data is stored at higher resolution in the vicinity of an event flag). In some embodiments, event data is extracted from continuously stored data. In some embodiments, event data is uploaded (e.g., immediately, at a later time, etc.). In some embodiments, flag data (e.g., an event type, an event severity, etc.) is uploaded. In some embodiments, flag metadata (e.g., a list of flags, a flag identifier, etc.) is uploaded.

Figure 3:
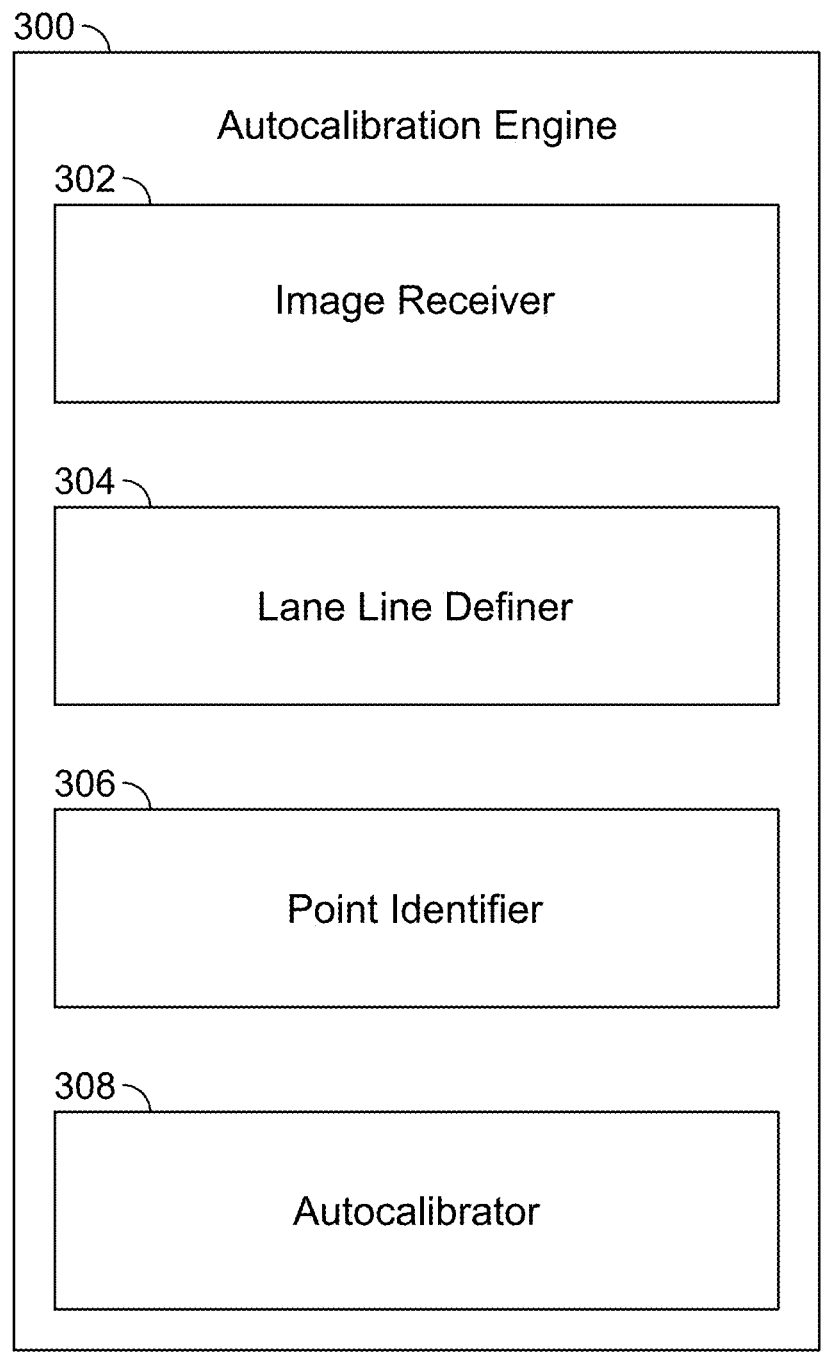
FIG. 3 is a block diagram illustrating an embodiment of an autocalibration engine.

FIG. 3 is a block diagram illustrating an embodiment of an autocalibration engine. In some embodiments, autocalibration engine 300 comprises autocalibration engine 104 of FIG. 1. In some embodiments, autocalibration engine 300 comprises autocalibration engine 210 of FIG. 2. In the example shown, autocalibration engine 300 comprises image receiver 302. In various embodiments, data received by image receiver 302 is processed by lane line definer 304, point identifier 306, and autocalibrator 308 to determine a height and an offset of a vehicle mounted camera. Image receiver 302 comprises an interface to one or more vehicle mounted cameras. In some embodiments, image receiver 302 communicates with a vehicle data server. Image receiver 302 receives video data, still image data, image or video metadata (e.g., GPS data), or any other appropriate data. Lane line definer 304 analyses data from image receiver 302 to determine a set of lane lines. In various embodiments, lane line definer 304 detects lane marker points, aggregates lane marker points into lane lines, fits lines to aggregated points, applies a machine learning model to received image data, or applies any other appropriate line definition method to determine the set of lane lines. Point identifier 306 analyses the set of lane lines from lane line definer 304 and determines points to be used by autocalibrator 308 to calculate height and offset of a vehicle mounted camera. In various embodiments, points determined by point identifier 306 include intersection points between pairs of lines, points a fixed distance from an image border, points corresponding to an image horizon, or any other relevant points. Autocalibrator 308 calculates height(s) and offset(s) of a vehicle mounted camera using the points determined by point identifier 306, the lines determined by lane line definer 304, the data received by image receiver 302, or any other relevant data. In some embodiments, autocalibrator 308 calculates height and offset using a plurality of heights and plurality of offsets. For example, lane line definer 304 identifies a number of lane lines in the image data and point identifier 306 identifies a set of points relevant to the height and offset calibration for each pairing of lines identified in the forward image (e.g., if there are four lane lines identified-lane 1, lane 2, lane 3, and lane 4, then there are six pairings lane 1 and lane 2, lane 1 and lane 3, lane 1 and lane 4, lane 2 and lane 3, lane 2 and lane 4, and lane 3 and lane 4). In some embodiments, lane line definer 304 identifies a number lane lines and the lane lines that bracket the vehicle position are selected and only points identified related to the bracketing lane lines are determined by point identifier 306.

Figure 4:
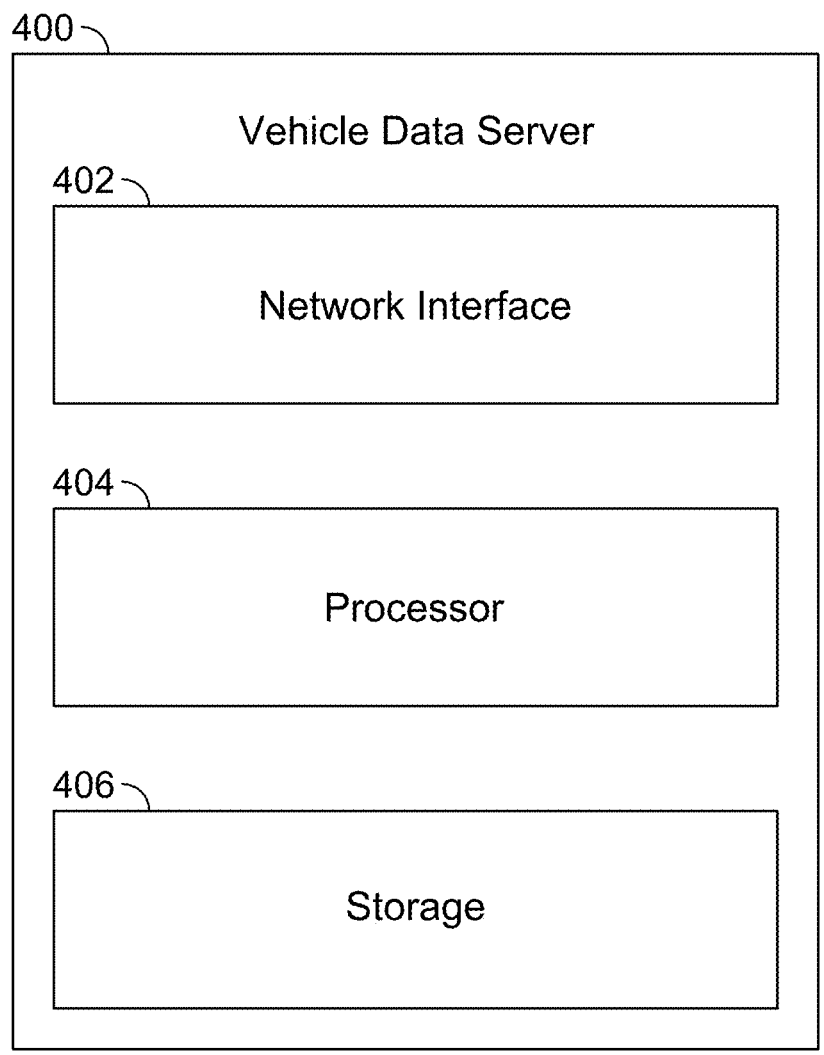
FIG. 4 is a block diagram illustrating an embodiment of a vehicle data server.

FIG. 4 is a block diagram illustrating an embodiment of a vehicle data server. In some embodiments, vehicle data server 400 comprises vehicle data server 108 of FIG. 1. In the example shown, vehicle data server 400 comprises processor 404. In various embodiments, processor 404 comprises a processor for aggregating and analyzing event data, collecting video or image data, determining camera height and offset, or for any other appropriate purpose. In some embodiments, vehicle data server 400 receives images from a vehicle event recorder and analyzes the images to determine camera height and offset and stores the camera height and offset. These stored values can be monitored over time to determine whether a vehicle event recorder has been moved. Also, camera height and offset data can be received from a vehicle event recorder to compare calculations. In some embodiments, camera height and offset data can be provided to a vehicle event recorder for comparison. In some embodiments, in the event that comparisons are not aligned with one another, an updated autocalibration engine is provided to a vehicle event recorder from vehicle data server 400. In some embodiments, vehicle data server 400 updates autocalibration engine to a vehicle event recorder automatically in the event that the autocalibration engine is updated on vehicle data server 400. Storage 406 comprises a data storage (e.g., a random access memory (RAM), a read only memory (ROM), a nonvolatile memory, a flash memory, a hard disk, or any other appropriate data storage). In various embodiments, storage 406 comprises a data storage for storing instructions for processor 404, vehicle event recorder data, vehicle event data, sensor data, video data, map data, machine learning algorithm data, or any other appropriate data. In various embodiments, network interface 402 comprises one or more of a GSM interface, a CDMA interface, a LTE interface, a UMTS interface, a WiMAX interface, a DSRC interface, a WiFi™ interface, an Ethernet interface, USB interface, a Bluetooth™ interface, an Internet interface, a fiber optic interface, or any other appropriate interface. In various embodiments, vehicle data server 400 receives events, maneuvers, data, or any other appropriate information from one or more vehicle event recorders.

Figure 5A:
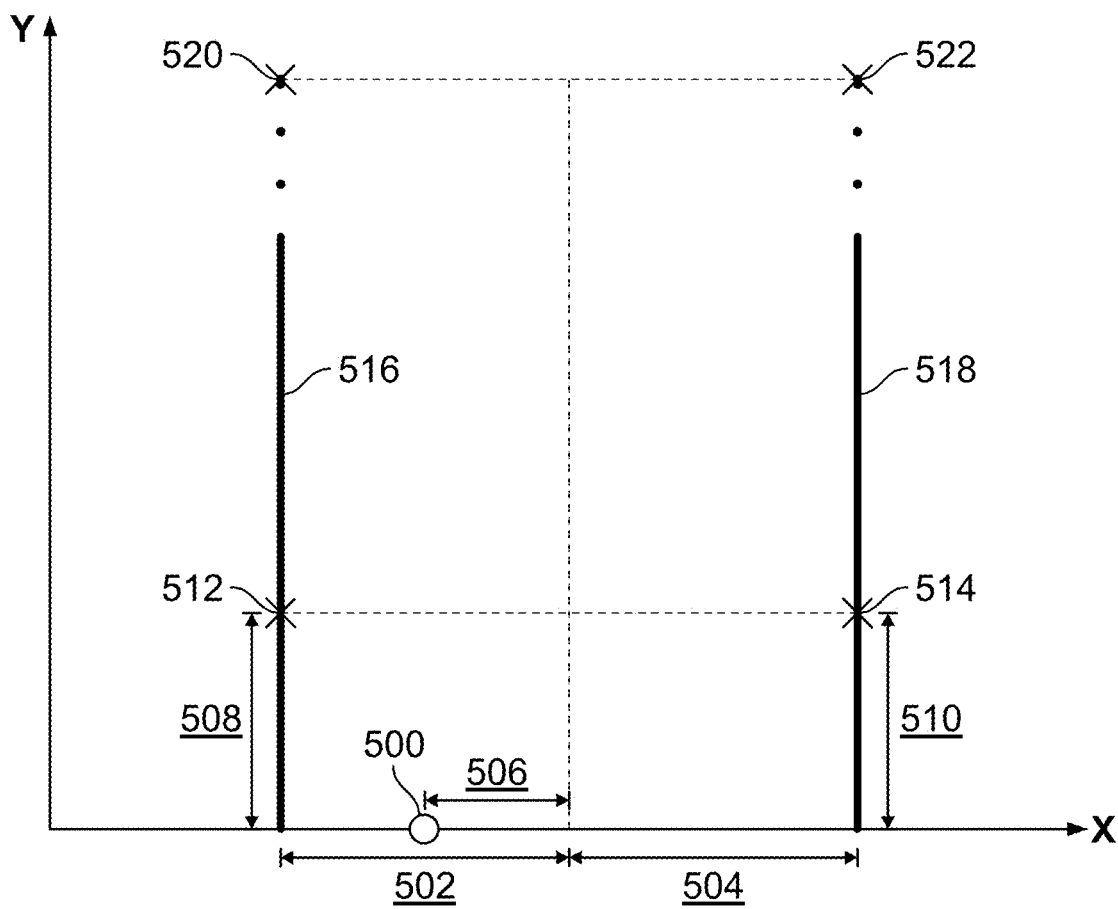
FIG. 5A is a diagram illustrating an embodiment of point identification in an overhead view.

FIG. 5A is a diagram illustrating an embodiment of point identification in an overhead view. In the example shown, line 516 and line 518 correspond to a lane as seen from above. Line 516 is distance 502 from the center of the lane. Line 518 is distance 504 from the center of the lane, distance 504 being equal to distance 502. Camera 500 is a camera mounted on a vehicle (not shown) driving in the lane. In some embodiments, camera 500 is a part of a vehicle event recorder (e.g., camera 102 of FIG. 1). Camera 500 is distance 506 away from the center of the lane. Distance 506 also corresponds to the horizontal offset of camera 500 with respect to the vehicle when the vehicle is positioned at the center of the lane. Point 512 and point 520 have been identified on line 516, in front of camera 500. Point 512 is a distance 508 in front of camera 500, while point 520 is a great distance away from the camera. Point 514 and point 522 have been identified on line 518, in front of camera 500. Point 514 is a distance 510 in front of camera 500, equal to distance 508, while point 522 is a great distance away from the camera.

Figure 5B:
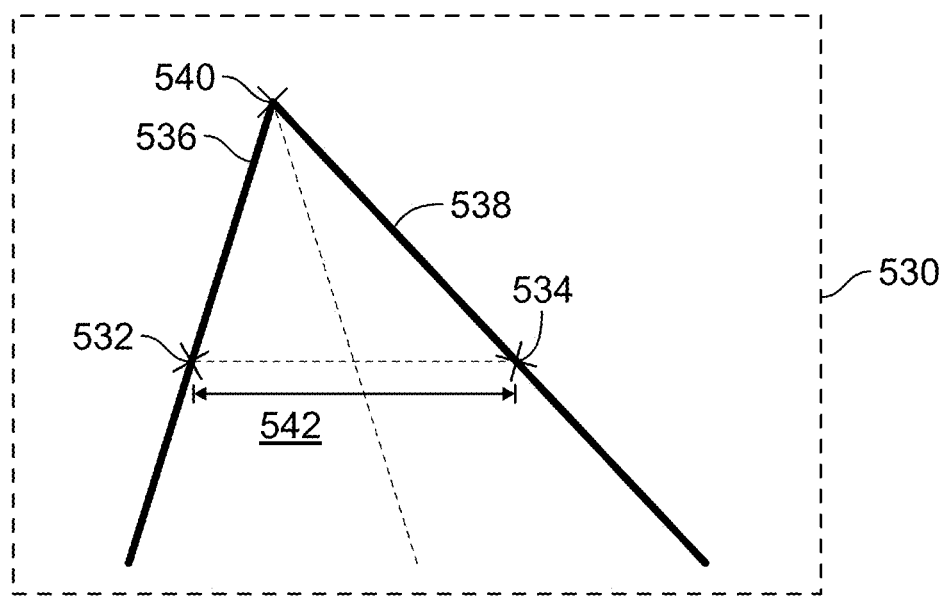
FIG. 5B is a diagram illustrating an embodiment of point identification in a view from a vehicle mounted camera.

FIG. 5B is a diagram illustrating an embodiment of point identification in a view from a vehicle mounted camera. In some embodiments, view 530 comprises a typical view from the perspective of the vehicle mounted camera (e.g., from the perspective of camera 500 of FIG. 5A) depicting line 536 and line 538. Line 536 and line 538 correspond to a lane (e.g., the lane represented by lines 516 and 518 of FIG. 5A). Points 532 and 540 have been identified on line 536. Point 532 is a fixed distance in front of the vehicle mounted camera (e.g., Point 512 of FIG. 5A), while point 540 is very far in front of the vehicle mounted camera (e.g., Point 520 of FIG. 5A). Point 534 and point 540 have been identified on line 538. Point 534 is a fixed distance in front of the vehicle mounted camera (e.g., Point 514 of FIG. 5A), while point 540 is very far in front of the vehicle mounted camera (e.g., Point 522 of FIG. 5A). Distance 542 between point 532 and point 534 corresponds to the width of the lane in front of the vehicle mounted camera (e.g., the sum of distances 502 and 504 in FIG. 5A) accounting for the perspective of the camera. In some embodiments, point 532 and point 534 are identified based on distance from a border of view 530. In such embodiments, it is desired that the camera stay level, i.e., roll of the camera is nearly zero. In the example shown, the distance between point 532 and the bottom border of view 530 is equal to the distance between point 534 and the bottom border. Point 540 is an intersection between two lane lines, being identified on both line 536 and line 538. In the example shown, point 540 represents a horizon point in view 530.

Figure 6A:
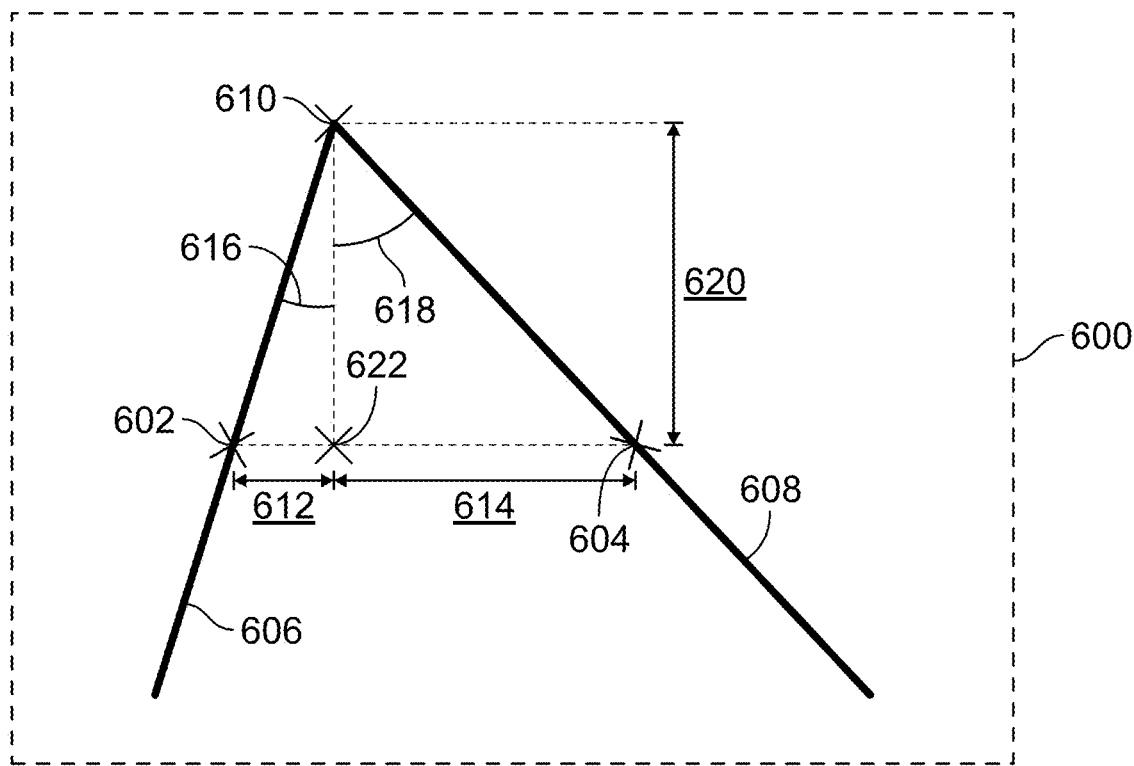
FIG. 6A is a diagram illustrating an embodiment of height and offset calculation in a view from a vehicle mounted camera.

FIG. 6A is a diagram illustrating an embodiment of height and offset calculation in a view from a vehicle mounted camera. In some embodiments, the view in FIG. 6A corresponds to the view in FIG. 5B. In the example shown, view 600 comprises a typical view from the vehicle mounted camera and includes point 602, point 604, and point 610, points identified for height and offset calculation. Point 602 and point 604 are a fixed distance in front of the camera (e.g., Points 532 and 534 of FIG. 5B). Point 610 is very far in front of the camera and represents an intersection point between line 606 and line 608 (e.g., Point 540 of FIG. 5B). A dotted horizontal line spanning distance 612 and distance 614 has been drawn between point 602 and point 604. The sum of distance 612 and distance 614 corresponds to the width of the lane in front of the vehicle mounted camera (e.g., the sum of distance 502 and distance 504 in FIG. 5A) accounting for the perspective of the camera. A line spanning distance 620, perpendicular to the horizontal line spanning distance 612 and distance 614, has been drawn below point 610. These perpendicular lines intersect at point 622. Angle 616 can be determined using distance 612 and distance 620. Angle 618 can be determined using distance 614 and distance 620.

In some embodiments, scaling introduced by the vehicle mounted camera (e.g., the relationship between real-world units and camera pixels) preserves the measure of angle 616 and angle 618, and by extension the ratios of distance 612, distance 614, and distance 620. In such embodiments, the distance of point 610 from the horizontal line between point 602 and point 604 (i.e., distance 620) corresponds with the height of the camera with respect to the lane width. The offset of point 622 with respect to the midpoint of the horizontal line between point 602 and point 604 corresponds with the offset of the camera with respect to the vehicle. Height of the camera is calculated using one or more of distance 612, distance 614, distance 620, angle 616, angle 618, and the real-world lane width value. For example, the equation $$h = \frac{d_{612} + d_{614}}{\tan\sigma + \tan\rho}$$

gives height h in terms of distance 612 ($d_{612}$), distance 614 ($d_{614}$), angle 616 ($\sigma$), and angle 618 ($\rho$). The sum of distance 612 and distance 614 can be substituted with the real-world lane width to solve for height in real-world units. Offset of the camera is calculated using one or more of the height of the camera, distance 612, distance 614, distance 620, angle 616, angle 618, and the real-world lane width value. For example, the equation $$\delta = \frac{d_{612} + d_{614}}{2} - h$$

tan σ gives offset δ in terms of distance 612 ($d_{612}$), distance 614 ($d_{614}$), angle 616 (σ), and height (h). The sum of distance 612 and distance 614 can be substituted with the real-world lane width to solve for offset in real-world units.

Figure 6B:
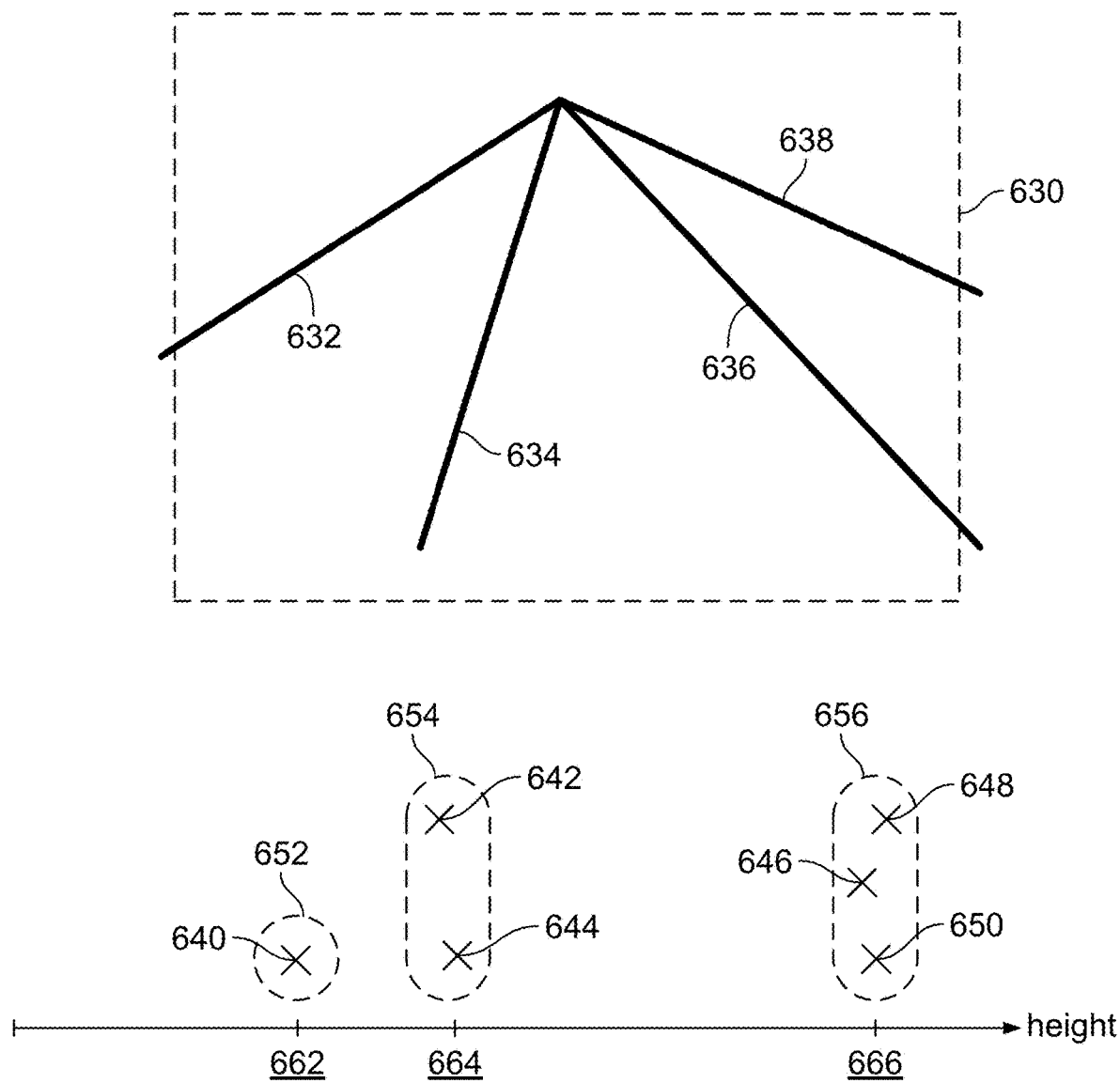
FIG. 6B is a diagram illustrating an embodiment of a clustering analysis in a view from a vehicle mounted camera.

FIG. 6B is a diagram illustrating an embodiment of a clustering analysis in a view from a vehicle mounted camera. In some embodiments, view 630 of FIG. 6B corresponds to view 600 of FIG. 6A. In the example shown, view 630 comprises a typical view from the vehicle mounted camera, in which several lanes may be visible. In the example shown, line 632, line 634, line 636, and line 638 have been identified, and pairs of lines (e.g., line 632 and line 634, line 634 and line 636, and line 636 and line 638 can be seen to correspond to lanes. Point identification and height and offset calculation have been performed for each pair of lines, assuming a standard lane width for each pair. For example, performing height calculation using points identified on pair of lines with line 632 and line 634 results in height value 648, whereas height calculation using points identified on the pair of lines with line 632 and line 638 results in height value 640. Height value 640 can be seen to be approximately one third of height value 648, as the pair of lines used in the point identification and calculation of height value 648 represent a "lane" three times the real-world lane width. Likewise, height value 642 and height value 644 are calculated using pair of lines with line 632 and line 636, and pair of lines with line 634 and line 638, respectively. Height values 642 and 644 can be seen to be approximately one half of height value 648, and the pairs of lines used in the calculation of height value 642 and height value 644 represent "lanes" two times the real-world lane width.

Among the plurality of height values (e.g., height value 640, height value 642, height value 644, height value 646, height value 648, and height value 650), cluster 652, cluster 654, and cluster 656 have been identified and associated with height value 662, height value 664, and height value 666. Cluster 652 comprises height value 640 and is associated with height value 662. Cluster 654 comprises height value 642 and height value 644 and is associated with height value 664. Cluster 656 comprises height value 646, height value 648, and height value 650 and is associated with height value 666. The cluster height value 662 and cluster height value 664 can be seen to be approximately one third and one half the cluster height value 666, respectively. Thus, height value 666 represents a maximal height value and an approximate multiple of all other cluster height values. In various embodiments, the cluster associated with the likeliest height is associated with a maximal height value, is associated with an approximate multiple of all other cluster height values, comprises the most height values (i.e., uses the most pairs of lines), or is chosen through any other appropriate clustering analysis method.

Figure 6C:
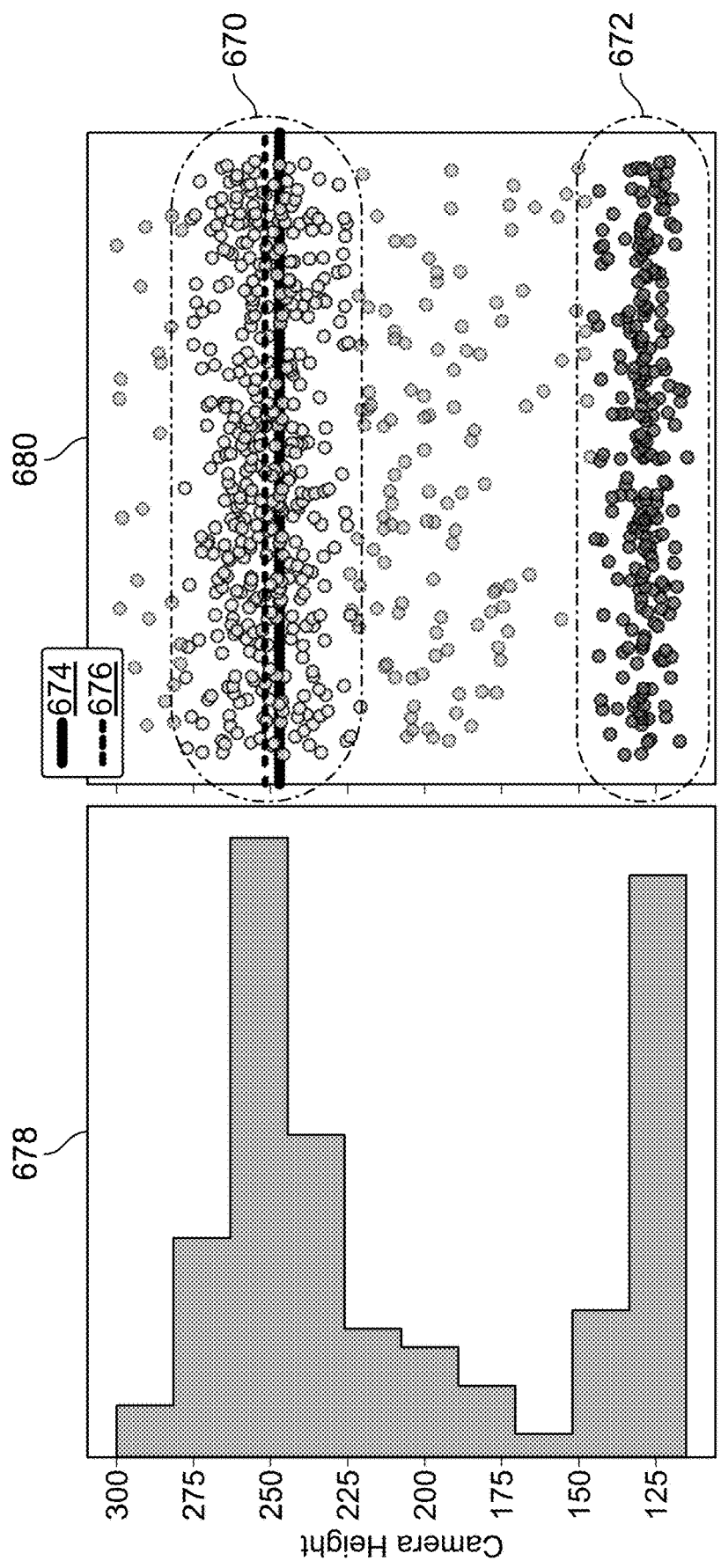
FIG. 6C is an example of a clustering analysis of the height of a vehicle mounted camera.

FIG. 6C is an example of a clustering analysis of the height of a vehicle mounted camera. The analysis comprises histogram 678 and scatter plot 680. A set of potential height values have been represented as points on scatter plot 680. The vertical axes of both plots indicate the height value measured. The horizontal axis of histogram 678 indicates the prevalence of height values within the set of potential height values. Cluster 670 and cluster 672 have been identified from the set of potential height values and marked on scatter plot 680. Cluster 670 is associated with a height of approximately 250 units, while cluster 672 is associated with a height of approximately 125 units, as seen on histogram 678. Thus, the height value associated with cluster 672 is approximately one half of the height value associated with cluster 670. In the example shown, the height of the vehicle mounted camera has been determined to be height 676. Height 676 is associated with cluster 670 and represented by a dashed line on scatter plot 680. Height 676 is also very near a manually measured height of the camera, represented by solid line 674 on scatter plot 680. In various embodiments, cluster 670 and associated height 676 may be chosen due to height 676 being a near multiple of the height associated with cluster 672, height 676 being a maximal height among the heights associated with the set of identified clusters, the high prevalence of height values near value 676 as seen on histogram 678, the high number of points within cluster 670 as seen on scatter plot 680, or for any other appropriate reason.

Figure 7:
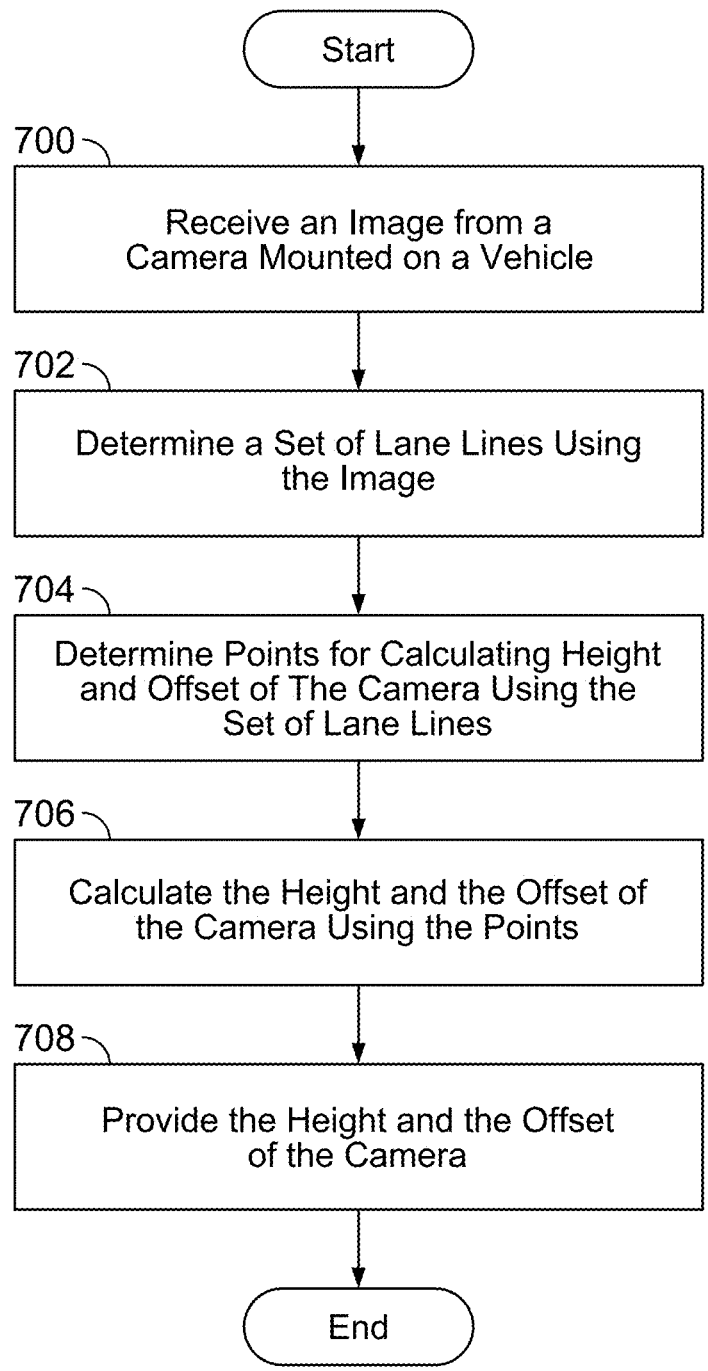
FIG. 7 is a flow diagram illustrating an embodiment of a process for calculating height and offset of a vehicle mounted camera.

FIG. 7 is a flow diagram illustrating an embodiment of a process for calculating height and offset of a vehicle mounted camera. In some embodiments, the process of FIG. 7 is executed by a vehicle event recorder (e.g., vehicle event recorder 100 of FIG. 1). In some embodiments, the process of FIG. 7 is executed by an autocalibration engine (e.g., autocalibration engine 300 of FIG. 3). In the example shown, in 700, an image is received from the vehicle mounted camera. In some embodiments, the image may be one of a plurality of images—for example, part of a video taken by the vehicle mounted camera. In some embodiments, the image may be associated with metadata (e.g., GPS data). In 702, a set of lane lines is determined using the image. For example, lane marker points are detected in the image, the marker points are aggregated into lane lines, and a corresponding set of lines are fit to the aggregated points. In some embodiments, a machine learning model is applied to image data received in 700 to determine the set of lane lines. In 704, points for calculating height and offset are determined using the set of lane lines. In various embodiments, points determined include intersection points between pairs of lines, points a fixed distance from an image border, points corresponding to an image horizon, or any other relevant points. In 706, the height and the offset of the vehicle mounted camera are calculated using the determined points. In some embodiments, the height and the offset are calculated using a plurality of heights and plurality of offsets. For example, points are determined in 704 for each pairing of lines in the set of lane lines (e.g., if there are four lane lines in the set of lane lines-lane 1, lane 2, lane 3, and lane 4, then there are six pairings lane 1 and lane 2, lane 1 and lane 3, lane 1 and lane 4, lane 2 and lane 3, lane 2 and lane 4, and lane 3 and lane 4, and the height and the offset are calculated using six height and six offset values). In 708, the height and the offset of the vehicle mounted camera are optionally provided. For example, the height and the offset of camera(s) associated with a vehicle event recorder are provided to the vehicle event recorder. In some embodiments, the height and offset are provided to a data server (e.g., the server 400 of FIG. 4).

Figure 8:
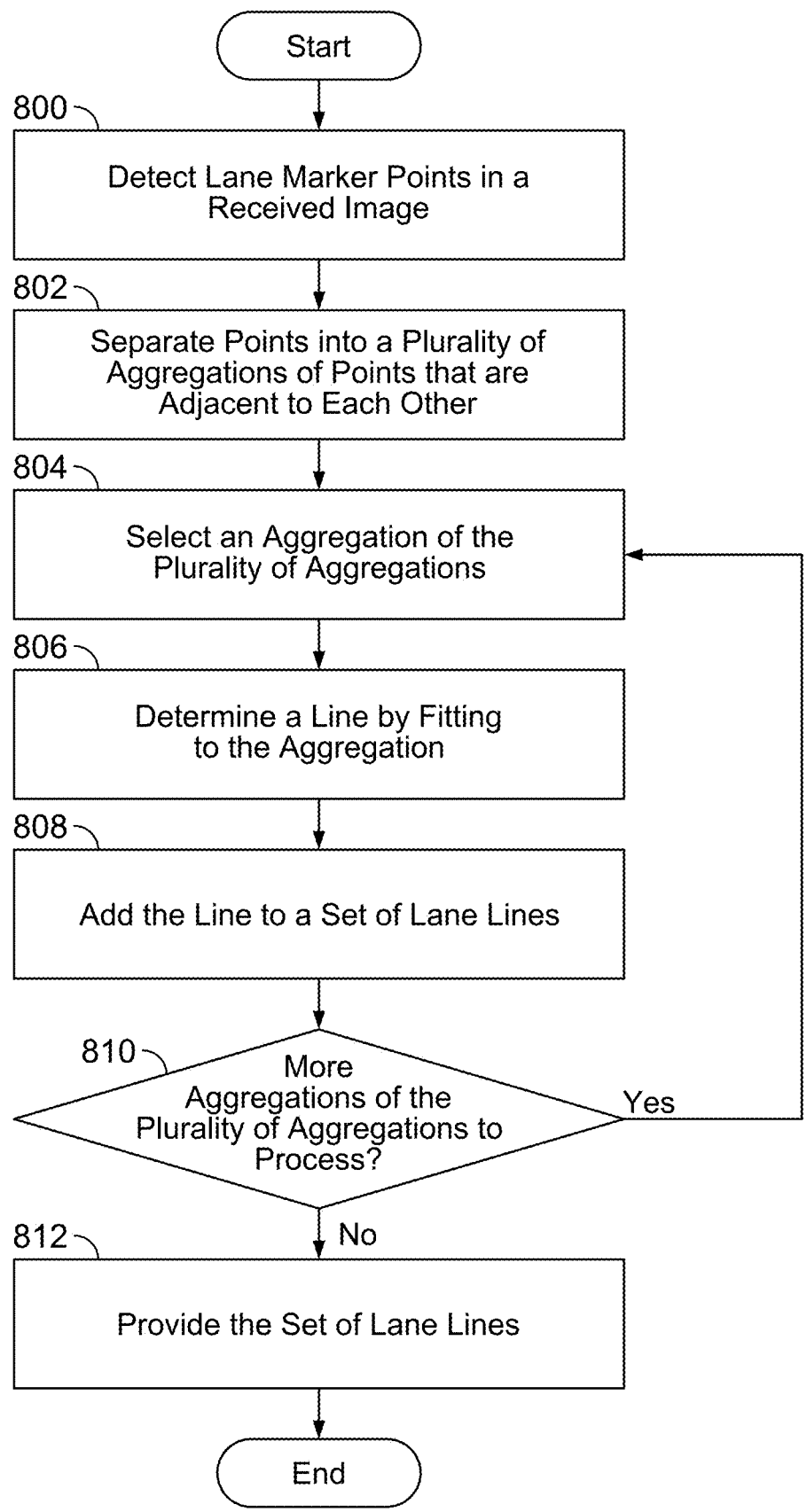
FIG. 8 is a flow diagram illustrating an embodiment of a process for determining a set of lane lines using a received image.

FIG. 8 is a flow diagram illustrating an embodiment of a process for determining a set of lane lines using a received image. In some embodiments, the process of FIG. 8 is used to implement 702 of FIG. 7. In 800, one or more lane marker points are detected in a received image. In some embodiments, a machine learning model is used to detect lane marker points. In some embodiments, additional data may be used to improve the accuracy of lane marker point detection (e.g., image metadata, image data of similar images, etc.). In 802, the lane marker points are separated into a plurality of aggregations of points that are adjacent to each other. For example, a chain of adjacent lane marker points corresponding with a lane line may be formed into an aggregation in the plurality of aggregations. In various embodiments, other appropriate point aggregation methods may be employed. In 804, an aggregation of points is chosen from the plurality of aggregations of points. For example, the aggregation containing the most points may be selected and processed. In some embodiments, a subset of the aggregations is selected and processed. In 806, a line is determined by fitting to the selected aggregation. In various embodiments, any appropriate line fitting method may be employed. In 808, the line is added to a set of lane lines. In some embodiments, the line may not be added (e.g., if the line fit in 806 does not sufficiently conform to the aggregation of points selected in 804—for example, a quality measure is below a threshold quality level). In 810, it is determined whether there are more aggregations of points to process from the plurality of aggregations of points. In the event that more aggregations of points are to be selected, then control passes to 804. In the event that no more aggregations of points are to be selected, then control passes to 812. In various embodiments, every aggregation may be selected, a set number of aggregations may be selected, any aggregations meeting certain criteria (e.g., minimum number of points, maximum distance between points, etc.) may be selected, or any other appropriate subset of aggregations may be selected. In 812, the set of lane lines is provided.

Figure 9:
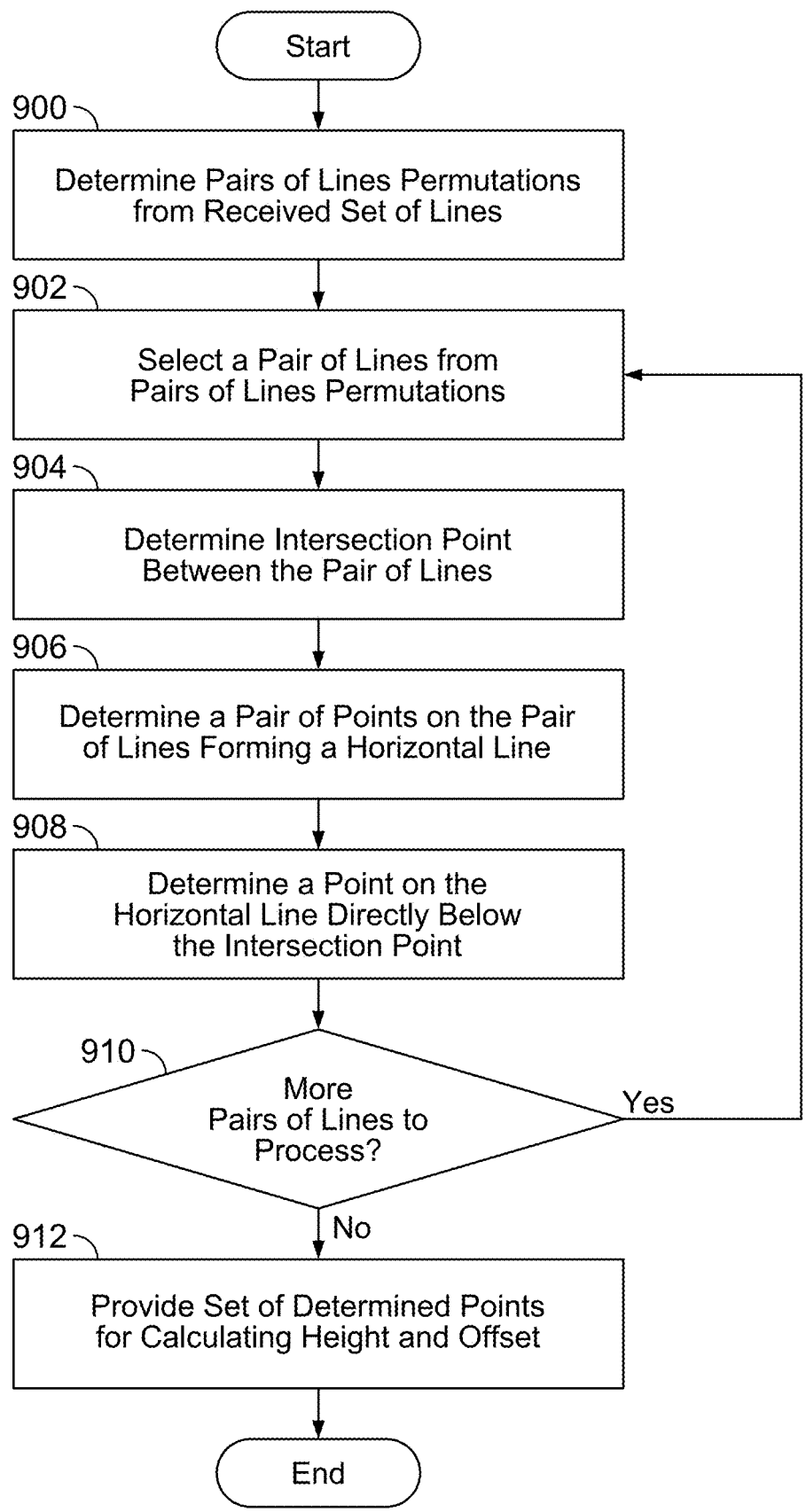
FIG. 9 is a flow diagram illustrating an embodiment of a process for determining a set of points using a received set of lines.

FIG. 9 is a flow diagram illustrating an embodiment of a process for determining a set of points using a received set of lines. In some embodiments, the process of FIG. 9 is executed by a vehicle event recorder (e.g., vehicle event recorder 100 of FIG. 1). In some embodiments, the process of FIG. 9 is executed by an autocalibration engine (e.g., by point identifier 306 as part of autocalibration engine 300 of FIG. 3). In 900, a set of lines is received and permutations of pairs of lines are formed from the received set of lines. For example, the set of lines provided in 812 of FIG. 8 are received and all possible two-line permutations from the set are formed. In some embodiments, only a subset of possible permutations of pairs of lines are formed. In 902, a pair of lines is selected from the permutations of pairs of lines. In various embodiments, the pair is selected arbitrarily, selected based on criteria regarding the lines (e.g., angle, confidence of line fit, etc.) or selected using any appropriate selection method. In 904, an intersection point is determined between the two lines in the selected pair of lines. For example, point 540 in FIG. 5B is found between lines 536 and 538, and corresponds to a horizon point used in height and offset calculation. In 906, a pair of points on the pair of lines is determined such that the points form a horizontal line intersecting each of the pair. For example, point 532 and point 534 on line 536 and line 538 of FIG. 5B form a horizontal line, the length of which corresponds to the width of the lane. In various embodiments, other methods of finding points on the pair of lines may be employed to ensure the line formed by the points corresponds to the width of the lane. In 908, a point on the horizontal line and directly below the intersection point of 904 is determined. For example, point 622 of FIG. 6A is found on the line formed by point 602 and point 604, directly below point 610. In some embodiments, this point is found when calculating height and offset using other points in the set of determined points. In 910, it is determined whether there are more pairs of lines to process from the permutations of pairs of lines. In the event that more pairs of lines are to be selected, then control passes to 902. In the event that no more pairs of lines are selected, then control passes to 912. In various embodiments, every permutation may be selected, a set number of permutations may be selected, any permutations meeting certain criteria may be selected, or any other appropriate subset of permutations may be selected. In 912, the set of determined points is provided. In some embodiments, the set of determined points includes metadata about the points (e.g., which points are horizon points, which are intersection points, distance of the point in front of the camera, etc.).

Figure 10A:
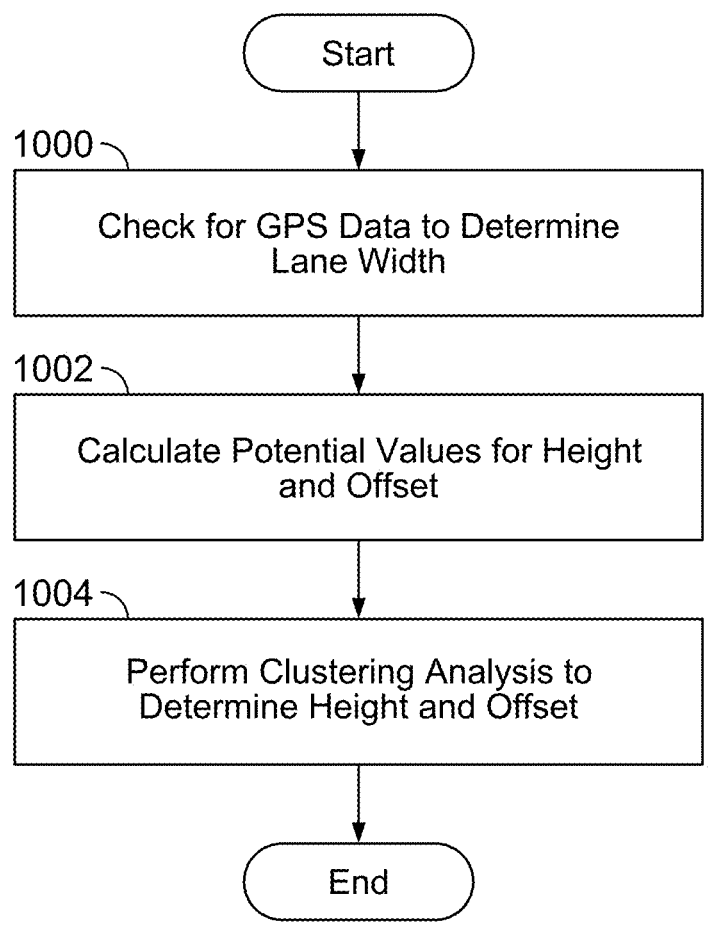
FIG. 10A is a flow diagram illustrating an embodiment of a process for calculating height and offset of a vehicle mounted camera.

FIG. 10A is a flow diagram illustrating an embodiment of a process for calculating height and offset of a vehicle mounted camera. In some embodiments, the process of FIG. 10A is executed by a vehicle event recorder (e.g., vehicle event recorder 100 of FIG. 1). In some embodiments, the process of FIG. 10A is executed by an autocalibration engine (e.g., by autocalibrator 308 as part of autocalibration engine 300 of FIG. 3). In 1000, GPS data is checked to determine lane width. For example, if the image received in 700 of FIG. 7 is associated with GPS data, and the data shows the image was taken on a road with a known lane width, the known lane width can be factored into the height and offset calculation. In 1002, potential values for height and offset are calculated. For example, the points provided in 912 of FIG. 9 and known lane width determined in 1000 may be utilized to determine angles (e.g., angle 616 and angle 618 in FIG. 6A) and ratios between height, offset and lane width. In some embodiments, a plurality of potential heights and a plurality of potential offsets are calculated. For example, if in 910 of FIG. 9 many pairs of lines were selected and processed, the set of points provided in 912 of FIG. 9 may produce a potential height value and potential offset value for every such pair. In 1004, a clustering analysis is performed on the plurality of potential heights and plurality of potential offsets to determine the likeliest height and likeliest offset of the camera. In various embodiments, the cluster associated with the likeliest height is associated with a maximal height value, is associated with an approximate multiple of all other cluster height values, comprises the most height values (i.e., uses the most pairs of lines), or is chosen through any other appropriate clustering analysis method.

Figure 10B:
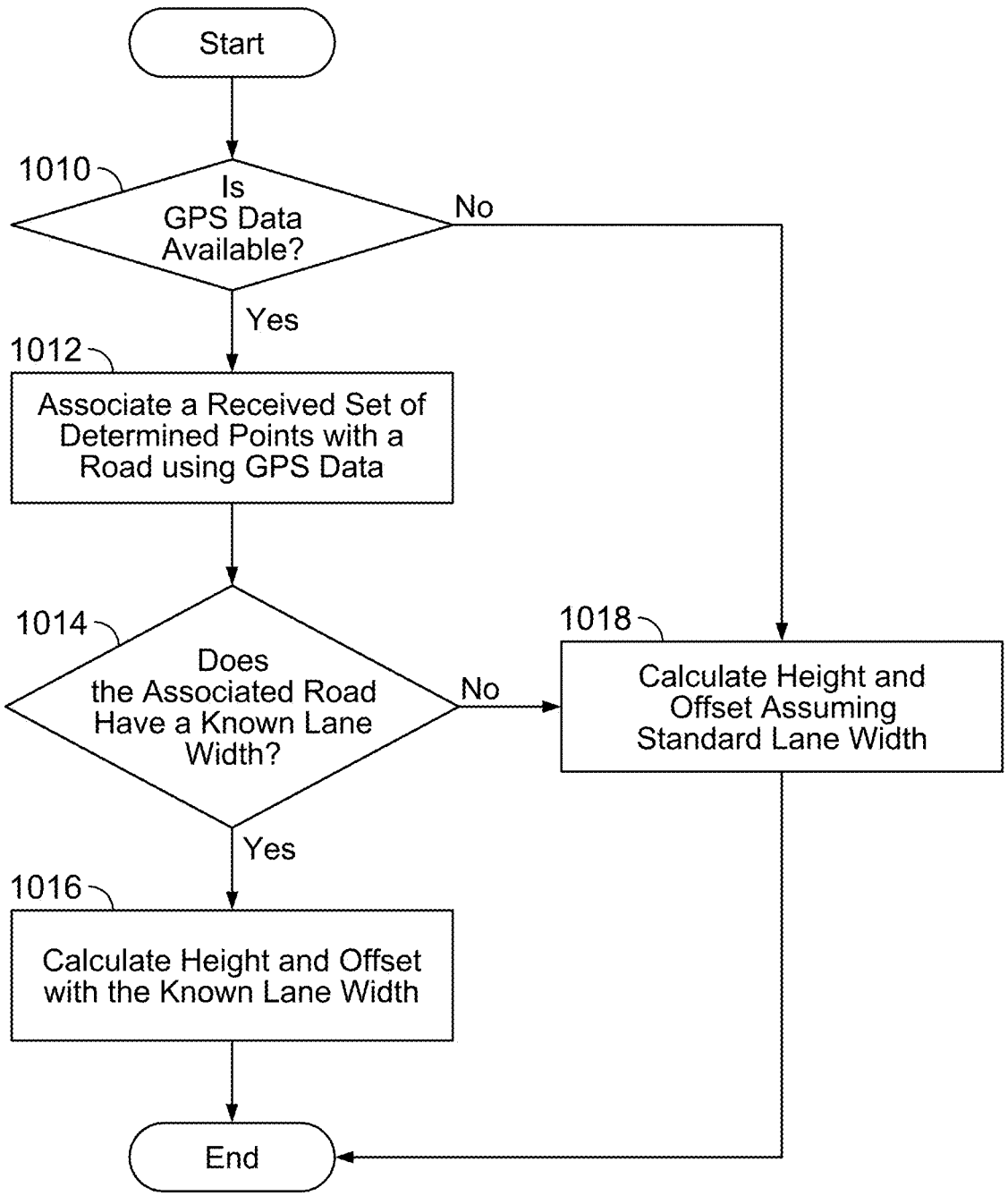
FIG. 10B is a flow diagram illustrating an embodiment of a process for determining width of a lane using GPS data.

FIG. 10B is a flow diagram illustrating an embodiment of a process for determining width of a lane using GPS data. In some embodiments, the process of FIG. 10B is executed by a vehicle event recorder (e.g., vehicle event recorder 100 of FIG. 1). In some embodiments, the process of FIG. 10B is executed by an autocalibration engine (e.g., by autocalibrator 308 as part of autocalibration engine 300 of FIG. 3). In 1010, it is determined whether GPS data is available. In the event that GPS data is available, then control passes to 1012.

In the event that GPS data is unavailable, then control passes to 1018. In 1012, a received set of determined points (e.g., from 912 of FIG. 9) is associated with a road using the GPS data determined to be available in 1010. In some embodiments, the GPS data is metadata associated with an image (e.g., the image analyzed to determine the received set of points). In 1014, it is determined whether the associated road has a known lane width. In the event that the road has a known lane width, then control passes to 1016. In the event that the road does not have a known lane width, control passes to 1018. In 1016, height and offset are calculated with the known lane width. For example, the points provided in 912 of FIG. 9 and known lane width may be utilized to determine angles (e.g., angle 616 and angle 618 in FIG. 6A) and ratios between height, offset and known lane width. In some embodiments, this calculation results in a plurality of potential values for height and offset (e.g., as in 1002 of FIG. 10A). In 1018, height and offset are calculated assuming a standard lane width. For example, the points provided in 912 of FIG. 9 and standard lane width may be utilized to determine angles (e.g., angle 616 and angle 618 in FIG. 6A) and ratios between height, offset and standard lane width. In some embodiments, this calculation results in a plurality of potential values for height and offset (e.g., as in 1002 of FIG. 10A).

Figure 11:
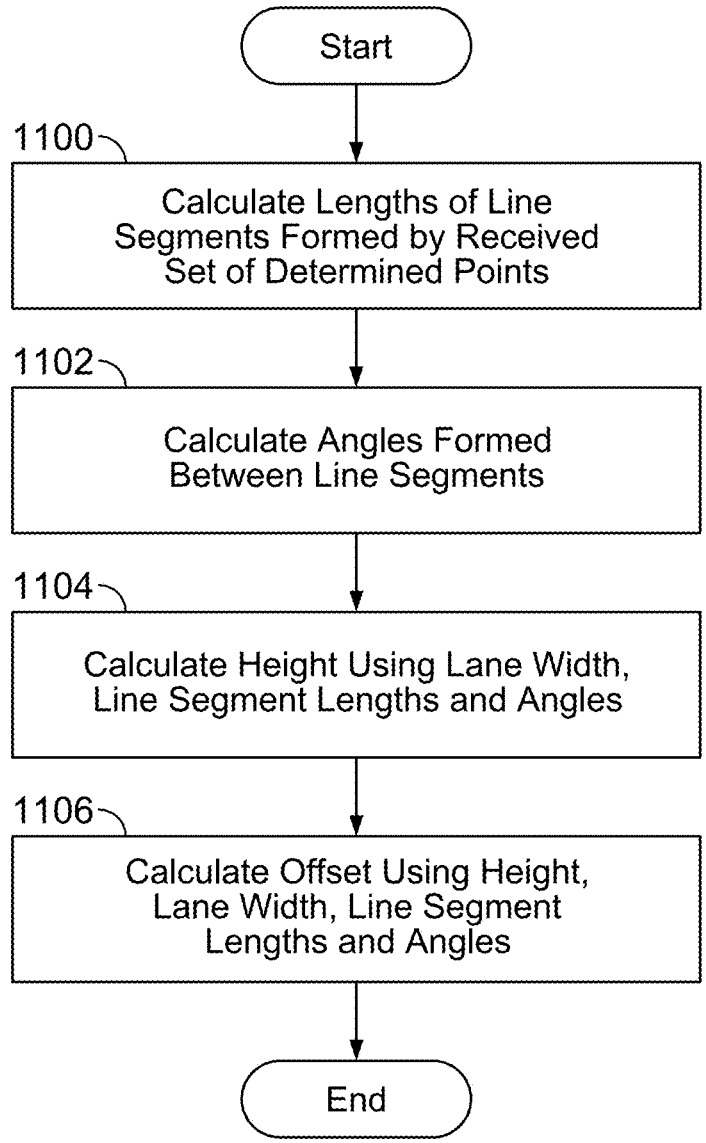
FIG. 11 is a flow diagram illustrating an embodiment of a process for calculating height and offset of a vehicle mounted camera.

FIG. 11 is a flow diagram illustrating an embodiment of a process for calculating height and offset of a vehicle mounted camera. In some embodiments, the process of FIG. 11 implements 1002 of FIG. 10A. In some embodiments, the process of FIG. 11 implements 706 of FIG. 7. In 1100, the lengths of line segments formed by a received set of determined points (e.g., points provided in 912 of FIG. 9) are calculated. For example, length 612, length 614, and length 620 of FIG. 6A may be calculated based on the associated lines formed by received set of points (e.g., point 602, point 604, point 610, and point 622) in 1100 of the process of FIG. 11. In 1102, angles formed between the line segments are calculated. For example, angle 616 and angle 618 of FIG. 6A may be calculated based on the line segments. In 1104, the height of the vehicle mounted camera is calculated using the lane width, the line segment lengths calculated in 1100, and the angles calculated in 1102. For example, the ratio of the sum of length 612 and length 614 (in FIG. 6A) to the length 620 (in FIG. 6A) is equivalent to the sum of the trigonometric tangent of angle 616 and the trigonometric tangent of angle 618. In some embodiments, (e.g., when vertical and horizontal scalings of objects in the camera are equal) the ratio of the lane width to the height of the vehicle mounted camera is equal to the sum of trigonometric tangents and the height of the camera can be calculated using the sum (e.g., using the height equation described in FIG. 6A). In such embodiments, changes in pitch and yaw of the camera, and a constant rate of change in the elevation of road, do not hinder the accuracy of the calculation. In 1106, the offset of the vehicle mounted camera is calculated using the height calculated in 1104, the lane width, the line segment lengths calculated in 1100, and the angles calculated in 1102. For example, the trigonometric tangent of angle 616 of FIG. 6A multiplied by the height calculated in 1104 provides the real-world equivalent of length 612, the offset of the camera measured from the edge of the lane. The offset from the center of the lane may be found by halving the lane width and subtracting this edge offset value (e.g., using the offset equation described in FIG. 6A).

Figure 12:
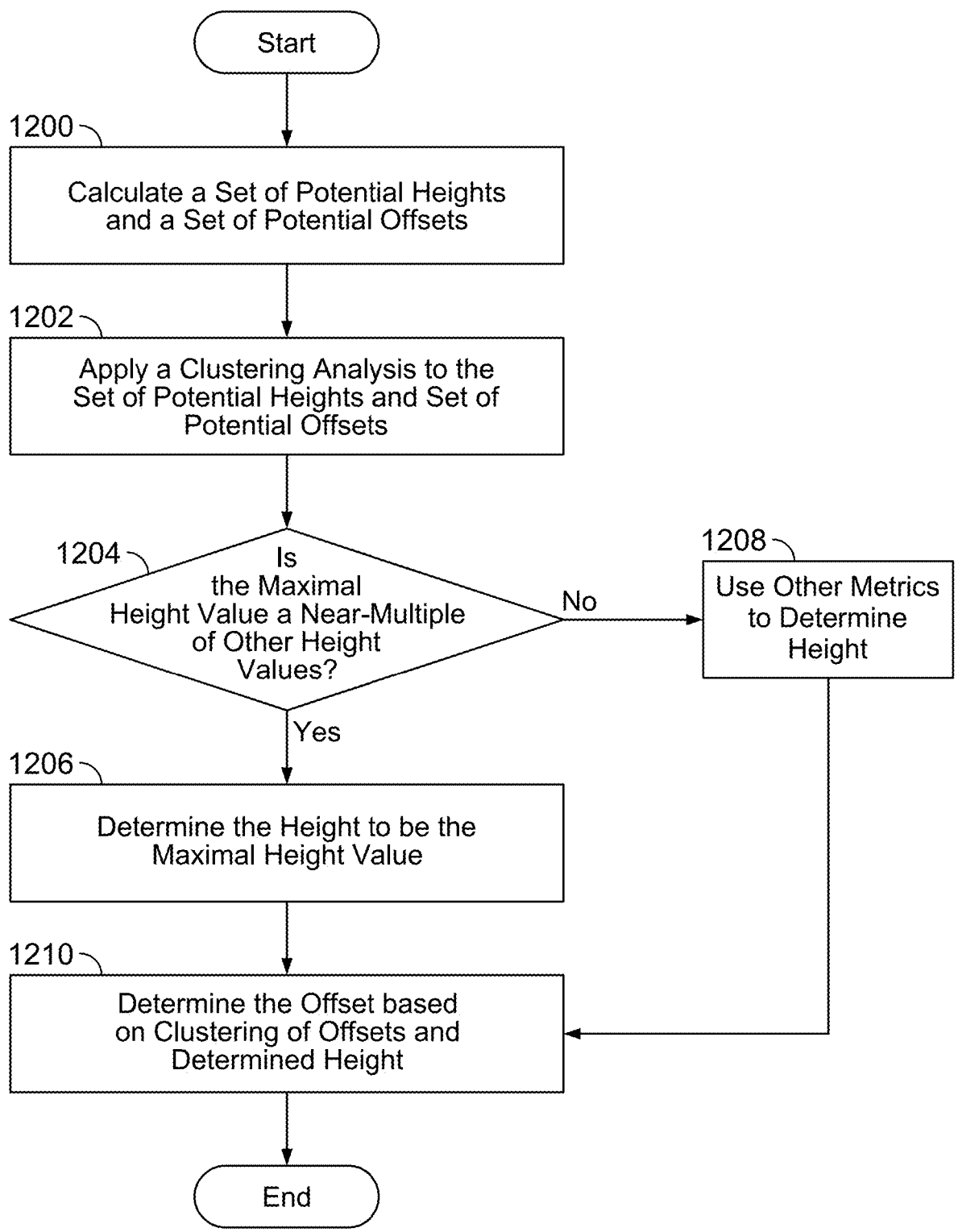
FIG. 12 is a flow diagram illustrating an embodiment of a process for performing a clustering analysis to determine height and offset of a vehicle mounted camera.

FIG. 12 is a flow diagram illustrating an embodiment of a process for performing a clustering analysis to determine height and offset of a vehicle mounted camera. In some embodiments, the process of FIG. 12 implements 1004 of FIG. 10A. In 1200, a set of potential heights and a set of potential offsets are calculated. In some embodiments, the process of FIG. 11 is used to calculate each potential height and potential offset. In some embodiments, the sets of potential heights and potential offsets may be received (e.g., from 1002 of FIG. 10A). In 1202, a clustering analysis is applied to the set of potential heights and potential offsets. For example, cluster 652, cluster 654, and cluster 656 of FIG. 6B have been identified and associated with height value 662, height value 664, and height value 666. In 1204, it is determined whether the maximal height value is a near-multiple of other height values. For example, value 666 of FIG. 6B is about two times value 664 and about 3 times value 662. In the event that the maximal height value is a near-multiple of other height values, then control is passed to 1206, wherein the height of the camera is determined to be the maximal height value. In the event that the maximal height value is not a near-multiple of other height values, then control is passed to 1208. In 1208, other metrics are used to determine height. In various embodiments, the determined height may be associated with a cluster with the most points, a cluster with the narrowest range of values, a cluster with associated height closest to an expected value, a cluster associated with the maximal height, or any other appropriate cluster. In 1210, the offset of the camera is determined based on the clustering of offsets and the determined height. In some embodiments, each height value in the set of potential heights may be associated with an offset value in the set of potential offsets. In some such embodiments, the offsets associated with heights in the cluster chosen in 1206 or 1208 are used to determine the offset of the camera.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
  an interface configured to:
    receive an image from a camera mounted on a vehicle;
  a processor configured to:
    determine a set of lane lines using the image;
    determine points for calculating height and offset of the camera using the set of lane lines, wherein the points for calculating the height and the offset of the camera are determined using a pair of lane lines from the set of lane lines; and
    calculate the height and the offset of the camera using the points.

2. The system of claim 1, wherein the processor is further configured to provide the height and the offset of the camera.

3. The system of claim 1, wherein the image is received from a vehicle event recorder.

4. The system of claim 1, wherein the image is one of a plurality of images.

5. The system of claim 1, wherein determining the set of lane lines includes detecting lane marker points.

6. The system of claim 5, wherein determining the set of lane lines includes aggregating the lane marker points into a lane line.

7. The system of claim 6, wherein determining the set of lane lines includes fitting a line to the aggregated lane marker points.

8. The system of claim 1, wherein determining the set of lane lines includes using a machine learning model.

9. The system of claim 1, wherein determining the pair of lane lines includes using a machine learning model.

10. The system of claim 1, wherein determining the pair of lane lines includes selecting an arbitrary pair of lane lines from the set of lane lines.

11. The system of claim 1, wherein determining the pair of lane lines includes iterating through one or more pairs of lane lines from the set of lane lines.

12. The system of claim 1, wherein the points for calculating the height and the offset of the camera include an intersection between two lane lines.

13. The system of claim 1, wherein calculating the height and the offset uses GPS data to determine lane width.

14. The system of claim 1, wherein the calculated height and the calculated offset are one of a plurality of heights and a plurality of offsets.

15. The system of claim 14, wherein the processor is further configured to calculate a likeliest height and a likeliest offset using the plurality of heights and the plurality of offsets.

16. The system of claim 15, wherein the likeliest height is determined using a clustering analysis.

17. The system of claim 16, wherein the likeliest height is associated with a cluster and wherein the cluster is associated with a maximal height.

18. A method, comprising:
receiving an image from a camera mounted on a vehicle;
determining, using a processor, a set of lane lines using the image;
determining points for calculating height and offset of the camera using the set of lane lines, wherein the points for calculating the height and the offset of the camera are determined using a pair of lane lines from the set of lane lines; and
calculating the height and the offset of the camera using the points.

19. A computer program product embodied in a non-transitory computer readable medium and comprising computer instructions for:
receiving an image from a camera mounted on a vehicle;
determining, using a processor, a set of lane lines using the image;
determining points for calculating height and offset of the camera using the set of lane lines, wherein the points for calculating the height and the offset of the camera are determined using a pair of lane lines from the set of lane lines; and
calculating the height and the offset of the camera using the points.

* * * * *